June 4, 1940. W. A. WHATMOUGH 2,203,117
CENTRIFUGAL CLUTCH
Filed March 12, 1938 2 Sheets-Sheet 1
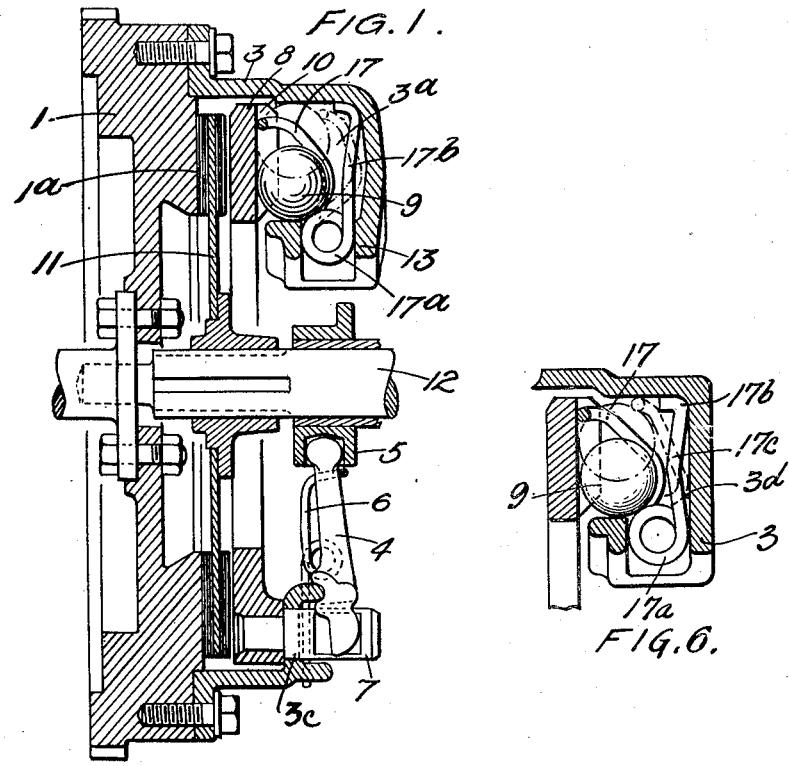
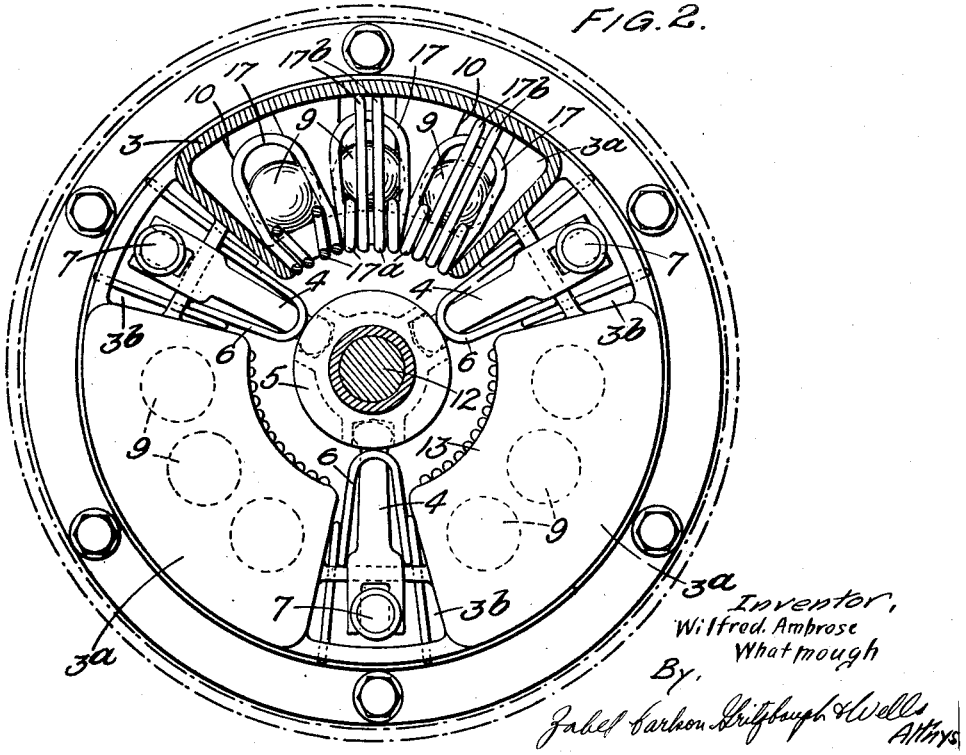
Inventor,
Wilfred Ambrose Whatmough
By Zabel Carlson Griffbaugh & Wells
Attys June 4, 1940.  W. A. WHATMOUGH  2,203,117
CENTRIFUGAL CLUTCH
Filed March 12, 1938   2 Sheets-Sheet 2
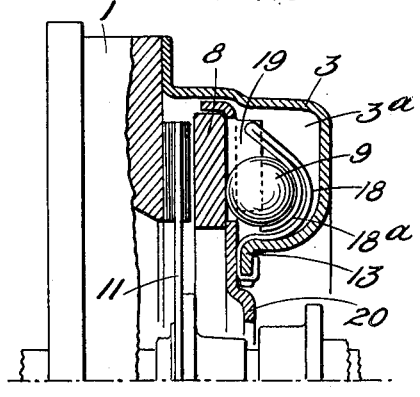
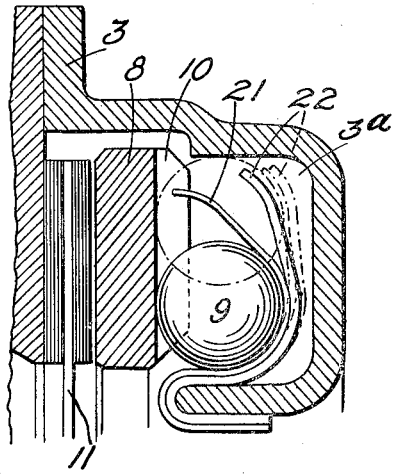
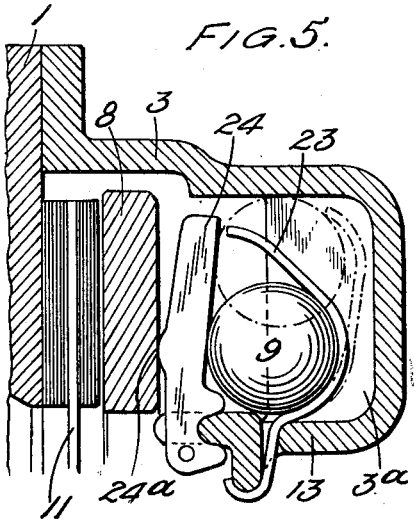
Inventor,
Wilfred Ambrose Whatmough
By,
Jabel Carlson Grisbaugh & Wells.
Attys.

Patented June 4, 1940

2,203,117

UNITED STATES PATENT OFFICE 2,203,117

CENTRIFUGAL CLUTCH

Wilfred Ambrose Whatmough, Golders Green, London, England

Application March 12, 1938, Serial No. 195,431
In Great Britain March 23, 1937

9 Claims. (Cl. 192—105)

This invention relates to centrifugal clutches of the kind (hereinafter referred to as the kind specified) comprising coaxial spaced driving and driven members, a presser plate adapted to be moved axially to force the driven member into engagement with the driving member and centrifugally-acting weights rotating with the driving member in such a manner that they will move freely outwards between converging surfaces and when the speed of rotation of the driving member exceeds a predetermined value displace the presser plate axially to engage the clutch. The invention is particularly useful when applied to friction clutches of the plate or disc type with or without means for permitting of voluntary disengagement when required.

An important object of the invention is to provide improved centrifugal clutches of the kind specified which shall be of simple and inexpensive construction but highly efficient in use. Another object is to provide means whereby the axial pressure exerted on the presser plate may be caused to increase rapidly as soon as the speed of the driving member rises above the predetermined value.

According to one feature of the invention, in a centrifugal clutch of the kind specified, the centrifugally-acting weights are carried entirely on the driving member and one or both of the converging surfaces cooperating with the centrifugally-acting weights is or are formed on or supported by resilient means.

Another feature of the invention is a centrifugal clutch of the kind specified wherein the presser plate is connected to the driving member to rotate in unison therewith.

Yet a further feature is a centrifugal clutch of the kind specified wherein means is provided for progressively increasing the ratio of axial thrust to centrifugal force as the centrifugally-acting weights move outwards under the action of the latter.

In order that the invention may be clearly understood, there will be described with reference to the accompanying drawings some examples of automatic centrifugal clutches constructed in accordance therewith.

In the drawings:

Figure 1 is an axial sectional view of a centrifugal clutch constructed in accordance with my invention;

Figure 2 is a sectional rear elevation thereof;

Figures 3 to 6 inclusive are detail views, mainly in axial section and certain, upon a larger scale, illustrating alternative constructions of the centrifugal clutch-operating means.

Corresponding parts in the several views are indicated by the same reference numerals.

Figures 1 and 2 illustrate one embodiment of my invention in centrifugal clutches having means for voluntary disengagement and in which the casing 3 is partitioned into two sets of three compartments, the compartments 3a of the one set alternating with the compartments 3b of the other set as shown in Figure 2. Toggle levers 4 operated by a clutch withdrawal collar 5 in known manner are arranged in the three compartments 3b spaced 120° apart, the withdrawal pressure being determined by the pressure of the springs 6 acting on the toggle levers. The ends of the levers remote from the collar 5 are forked to engage the rear ends of studs 7 secured in an annular presser plate 8 located within the casing 3, the studs extending through close-fitting apertures 3c in the latter (see Figure 1). In this construction the balls 9 are contained in the compartments 3a the rear walls of which are here substantially at right angles to the axis of the clutch. The inclined surface for co-operating with each ball 9 during its radial movement is provided by the U-shaped arm 17 of a mousetrap spring having its coils 17a located in an aperture in the rim 13 and its two free ends 17b bearing against the outer end of the rear wall of the compartment. The doubled or U-shaped arm 17 of the spring is bent comparatively sharply, as shown, to have an outer portion inclined for a substantial distance at an angle to the adjacent face of the presser plate 8. The two limbs of the U-shaped arm 17 are spaced sufficiently to serve as an additional guide for the ball 9 in its outward movement. The springs 6 normally hold the presser plate 8 away from the friction plate 11.

In this construction the movement of the ball 9 radially outwards causes a deflection of the spring arm 17 towards the dotted line position indicated. When the speed of the driving member reaches the predetermined value, the axial pressure due to the balls 9 deflecting the spring arm 17 exceeds the pressure of the "holding-off" springs 6 and thus forces the presser plate 8 towards the friction plate 11.

It will be noted that the rear wall of the compartment 3a is dished somewhat to provide clearance for the bends 17c of the arms 17 of the springs. Alternatively, this wall may be plane, as indicated at 3d in Figure 6, so that the said bends 17c contact therewith early in their movements towards the dotted line positions. In this case, the rating of the springs increases considerably as soon as the bends come to bear on the said walls.

A modification employing a different form of spring is illustrated in Figure 3. In this example, the inclined surface co-operating with the ball 9 is constituted by a leaf spring 18 secured at one end in the flanged rim 13 of the casing compartment 3a. The free end of the spring is inclined towards the presser plate 8 and is bent upon itself to provide an auxiliary spring 18a which normally holds the ball 9 lightly in contact with the presser plate 8. The guides for the ball 9 are here provided by outturned lugs 19 formed on a thin plate 20 secured to the presser plate 8 or to the casing 3.

The operation of this construction is substantially the same as that of the construction shown in Figures 1 and 2.

Figure 4 shows a further modification wherein the inclined surface for co-operating with the ball 9 is constituted by a leaf spring. In this case however the spring is laminated and composed of an inner light spring 21 and an outer heavy spring 22. The light spring 21 is inclined towards the presser plate 8 at a greater angle than the heavy spring 22 with the result that the first portion of the radial movement of the ball 9 has merely to cause deflection of the light spring 21. Further movement of the ball, however, brings it to a position in which it must deflect both the light and heavy springs, 21 and 22, in order to travel outwards.

In consequence of this arrangement it is ensured that the ratio of axial thrust to centrifugal force shall increase with increase in the speed of the driving member above the predetermined value.

The same result may be obtained, however, by the use of the alternative means shown in Figure 5. In this construction a single leaf spring 23 provides the necessary inclined surface for co-operating with the ball 9 but there is interposed between the latter and the presser plate 8 a lever 24 pivotally mounted by its inner end on the rim 13 of the compartment 3a. This lever has a projection 24a by which it bears on the presser plate and in the example the distance from the projection to the pivot for the lever is approximately half that between the said pivot and the outermost point on the lever contacted with by the ball during its radial movement.

It will be seen that the ratio of the axial thrust applied to the plate 8 to the centrifugal force produced by the balls 9 will increase as the balls move outwardly.

Each of the constructions shown in Figures 4 and 5 has the advantage of providing a low axial thrust to be resisted during the free speed range and a very rapid increase of axial thrust during the early stages of the engagement speed range of the clutch.

In each construction having provision for voluntary disengagement, sufficient clearance is provided to permit the necessary extra deflection of the springs during such disengagement of the clutch.

What I claim is:

1. A centrifugal clutch comprising a driving member, a presser plate arranged to rotate with and to have axial movement relative to said driving member, said member and said plate having portions thereof in axially spaced apart register, a plurality of rollable centrifugal weight elements disposed between said registering portions of said member and plate, and spring members carried by one of said portions of said member and plate and providing a yielding radial and inclined raceway for said weight elements whereby as said weight elements are urged radially outwardly under centrifugal force said presser plate will be urged in an axial direction under a force determinable by the resistance offered by the flexing of said springs, said spring members forming the sole interacting medium between said weights and the said clutch portion upon which they are carried.

2. A centrifugal clutch as claimed in claim 1, wherein the weights act upon the presser plate through the intermediary of a lever, the mechanical advantage due to the lever increasing with movement of the weights outwardly.

3. A centrifugal clutch, as defined in claim 1, wherein said spring members are so formed and mounted relative to said weight elements that their rate increases after predetermined deflection whereby to provide a variable resistance against which said weights may react during centrifugal operation.

4. A centrifugal clutch as claimed in claim 1, wherein the spring members each comprise a bent spring, the bend of which is adapted to strike an abutment after a predetermined deflection.

5. A centrifugal clutch as claimed in claim 1, wherein the spring members each comprise a laminated spring, the laminations of which become operative in succession.

6. A centrifugal clutch as claimed in claim 1, wherein the centrifugally-acting weights are constituted by balls.

7. A centrifugal clutch comprising a driving member, a presser plate arranged to rotate with and to have axial movement relative to said driving member, a plurality of metal balls interposed between axially spaced portions of said member and said plate and a plurality of spring members carried on one of said portions of said member and said plate and yieldingly urging said balls into engagement with the other one of said portions of said member and said plate, said spring members being so formed and disposed relative to said other one of said portions that radially outward movement of said balls under centrifugal force will cause said presser plate to be urged in a direction axially of said driving member under a force determinable by the resistance to deflection of said springs.

8. A centrifugal clutch comprising a pair of driving elements mounted to rotate together and to have relatively axial movement, means responsive to centrifugal force during rotation of said elements for causing relatively axial movement therebetween, said means comprising rollable weights engaging with a surface on one of said elements, spring members carried by the other of said elements and forming the sole interacting medium between the said other of said elements and said rollable weights, the weight engaging portions of said one element and said spring members being converging in directions radially outwardly relative to the axis of the clutch.

9. A centrifugal clutch, as defined in claim 8, wherein said spring members are formed to provide at least two stages of increasing resistance as said weights are urged radially outwardly.

WILFRED AMBROSE WHATMOUGH.